(12) United States Patent
Kurz et al.

(10) Patent No.: US 10,787,160 B2
(45) Date of Patent: Sep. 29, 2020

(54) ADJUSTABLE MAGNETIC VALVE

(71) Applicant: Robert Bosch GmbH, Stuttgart (DE)

(72) Inventors: Edgar Kurz, Heilbronn-Horkheim (DE); Massimiliano Ambrosi, Abstatt (DE); Michael Eisenlauer, Affalterbach (DE); Wolf Stahr, Abstatt (DE); Wolfgang Schuller, Cleebronn (DE)

(73) Assignee: Robert Bosch GmbH, Stuttgart (DE)

( * ) Notice: Subject to any disclaimer, the term of this patent is extended or adjusted under 35 U.S.C. 154(b) by 79 days.

(21) Appl. No.: 15/988,553

(22) Filed: May 24, 2018

(65) Prior Publication Data

US 2018/0340625 A1 Nov. 29, 2018

(30) Foreign Application Priority Data

May 29, 2017 (DE) .......................... 10 2017 208 939

(51) Int. Cl.
   *B60T 15/36* (2006.01)
   *B60T 13/68* (2006.01)
   *B60T 8/17* (2006.01)
   *F16K 31/08* (2006.01)
   *B60T 8/00* (2006.01)
   (Continued)

(52) U.S. Cl.
   CPC ............... *B60T 15/36* (2013.01); *B60T 8/00* (2013.01); *B60T 8/17* (2013.01); *B60T 8/367* (2013.01); *B60T 13/686* (2013.01); *F16K 31/0665* (2013.01); *F16K 31/082* (2013.01); *B60T 8/363* (2013.01); *B60T 2270/30* (2013.01)

(58) Field of Classification Search
   CPC ...... B60T 15/36; B60T 2270/30; B60T 8/363; B60T 8/367; B60T 13/686; B60T 8/17; B60T 8/00; F16K 31/0665; F16K 31/082
   See application file for complete search history.

(56) References Cited

U.S. PATENT DOCUMENTS 3,809,123 A * 5/1974 Heimann ............... F16K 31/082
                                                              137/625.5
4,253,493 A * 3/1981 English ..................... F01L 9/04
                                                             137/625.18
(Continued)

FOREIGN PATENT DOCUMENTS

CN          101065277 A      10/2007
CN          101936400 A       1/2011
(Continued)

*Primary Examiner* — Eric Keasel
(74) *Attorney, Agent, or Firm* — Maginot, Moore & Beck LLP

(57) ABSTRACT

An adjustable magnetic valve includes a magnet assembly and a guide sleeve in which a static component is arranged fixedly and a valve armature is arranged so as to be axially displaceable therein. The magnet assembly is pushed onto the static component and the guide sleeve. The static component forms an axial stop for the valve armature, which either forces a closing element into a valve seat or lifts the closing element from the valve seat depending on the direction in which the valve armature is driven. The valve armature and the static component are each formed as plastic components. The valve armature has a magnet receptacle that receives a permanent magnet, which is polarized in terms of its movement direction such that the permanent magnet is arranged within the magnet assembly regardless of the armature stroke.

20 Claims, 5 Drawing Sheets

(51) Int. Cl.
*F16K 31/06* (2006.01)
*B60T 8/36* (2006.01)

(56) References Cited

U.S. PATENT DOCUMENTS

| | | | | |
|---|---|---|---|---|
| 4,967,966 A | * | 11/1990 | Babitzka | F02M 51/0667 |
| | | | | 239/585.4 |
| 6,158,713 A | * | 12/2000 | Ohya | F16K 31/0679 |
| | | | | 137/870 |
| 6,742,764 B1 | | 6/2004 | Volz | |
| 8,833,732 B2 | * | 9/2014 | Heiko | F16K 31/082 |
| | | | | 251/129.15 |
| 9,080,686 B2 | * | 7/2015 | Hoppe | F16K 31/082 |
| 2011/0073790 A1 | * | 3/2011 | Ko | F16K 31/0675 |
| | | | | 251/129.15 |

FOREIGN PATENT DOCUMENTS

| | | |
|---|---|---|
| DE | 33 05 833 A1 | 9/1983 |
| DE | 10 2012 202 332 A1 | 8/2013 |
| EP | 1 936 248 A2 | 6/2008 |

* cited by examiner

ADJUSTABLE MAGNETIC VALVE

This application claims priority under 35 U.S.C. § 119 to patent application no. DE 10 2017 208 939.3, filed on May 29, 2017 in Germany, the disclosure of which is incorporated herein by reference in its entirety.

BACKGROUND

The disclosure relates to an adjustable magnetic valve.

In hydraulic brake systems with ESP functionality (ESP: Electronic Stability Program), for various functions, use is made of continuously adjustable magnetic valves in which a desired valve stroke is adjusted by means of force equilibrium between a spring force and hydraulic force, on the one hand, and a magnetic force, on the other hand. The closed-loop control is made more difficult by the severe non-linearity of the magnetic force as a function of an air gap in the magnetic circuit between a movable valve armature and a static component. The magnetic force increases overproportionately with decreasing air gap, as a result of which disturbances, such as for example pressure pulses in the hydraulics, can lead to large changes in the magnetic force in the case of a small air gap. To compensate these disturbances, complex closed-loop control is required in the case of small strokes and a small air gap. Furthermore, known adjustable magnetic valves are highly tolerance-sensitive because fluctuations, caused by the production process, in the surface quality of the pole surfaces can lead to poor reproducibility. It is furthermore difficult for the known adjustable magnetic valves to be adjusted over the entire armature stroke without additional measures. Furthermore, the weight and size of the pole core in the case of an adjustable magnetic valve which is closed when electrically deenergized influence the structural size and weight of the magnetic valve. Furthermore, during the assembly of adjustable magnetic valves which are closed when electrically deenergized, cumbersome setting processes are necessary for the air gap between pole core and valve armature.

DE 33 05 833 A1 has disclosed a bistable magnetic valve which has an exciter coil and an armature, which armature protrudes into said exciter coil and is composed of permanently magnetic material and is polarized in terms of its movement direction and forms a valve part. A magnetic-field-conducting body projects in the manner of a core into the exciter coil and fills a part of the length of the exciter coil. A further magnetic-field-conducting body is arranged adjacent to that end of the exciter coil into which the armature protrudes, and said further magnetic-field-conducting body is formed in the manner of a ring-shaped disk which surrounds the armature with a spacing. When the exciter coil is electrically deenergized, forces act between said magnetic-field-conducting bodies and the armature, which forces move the armature into, or at least hold said armature fixedly in, latch positions, and thus realize stable switching positions of the magnetic valve. In this magnetic valve, there is no need for a spring that can move the valve part into a predetermined latch position.

SUMMARY

The adjustable magnetic valve having the features of the disclosure has the advantage that the magnetic force is not stroke-dependent, and is directly proportional to the current intensity. Furthermore, embodiments of the magnetic valve according to the disclosure are adjustable over the entire stroke range of the movable valve armature. As a result of the valve armature and the static component being formed as plastics components, a weight reduction is realized, wherein the permanent magnet arranged within the magnet assembly replaces the previous construction with a magnetically conductive valve armature and a magnetically conductive static component. Since the magnetic force is not dependent on the armature stroke, disturbances, such as for example pressure pulses in the hydraulics, in the case of a small air gap do not lead to large changes in the magnetic force, such that also, no complex closed-loop control is required for the compensation of these disturbances in the case of small strokes and a small air gap.

Embodiments of the present disclosure provide an adjustable magnetic valve having a magnet assembly and having a guide sleeve in which a static component is arranged fixedly and a valve armature is arranged so as to be axially displaceable. The magnet assembly is pushed onto the static component and the guide sleeve, wherein the static component forms an axial stop for the valve armature. The valve armature can be driven by a magnetic force generated by the electrically energized magnet assembly and, during a movement in a closing direction, forces a closing element into a valve seat and, during a movement in an opening direction, lifts the closing element out of the valve seat. Here, the valve armature and the static component are each formed as plastics components, wherein the valve armature has, at its first face side facing toward the static component, a magnet receptacle which receives a permanent magnet, which is polarized in terms of its movement direction, such that the permanent magnet is arranged within the magnet assembly regardless of the armature stroke.

Embodiments of the adjustable magnetic valve according to the disclosure are preferably used in hydraulic brake systems.

Advantageous improvements of the adjustable magnetic valve are possible by means of the measures and refinements specified in the dependent claims.

Below, the arrangement of the permanent magnet within the magnet assembly regardless of the armature stroke is to be understood to mean that, in all positions of the valve armature between a closed end position and an open end position, the permanent magnet is surrounded by the magnet assembly or by a coil winding of the magnet assembly.

It is particularly advantageous that an axial position of the permanent magnet and of the movable valve armature can be predefined in a manner dependent on the current intensity of the electrically energized magnet assembly. It is advantageously possible by means of the current flow in the coil winding for the valve armature with the permanent magnet to be placed exactly in any desired axial position between the closed end position and the open end position. Thus, in embodiments of the adjustable magnetic valve according to the disclosure, the severely non-linear magnetic force characteristic curve of known adjustable magnetic valves is replaced by a linear magnetic force characteristic curve which advantageously facilitates closed-loop control of the required force equilibrium between spring force and hydraulic force, on the one hand, and magnetic force, on the other hand, for a desired held axial position. In this way, embodiments of the adjustable magnetic valve according to the disclosure are advantageously capable of exactly setting volume flows in the corresponding fluid system, in particular in a hydraulic brake system. If the current flow through the coil winding is increased, then the magnetic field strength generated by the magnet assembly is also increased, and the valve armature with closing element and permanent magnet is displaced counter to the spring force of the restoring spring and the fluid force acting in the magnetic valve. If the current flow through the coil winding is reduced, then the magnetic field strength generated by the magnet assembly is also reduced, and the valve armature with closing element and permanent magnet is displaced by the spring force of the restoring spring and the fluid force acting on the magnetic valve counter to the magnetic field strength.

The use of embodiments of the adjustable magnetic valve according to the disclosure creates, in the case of a hydraulic brake system, the potential for savings by standardization of the valve types used and reduction of the number of variants of valve types in the modular system for the hydraulic unit. By means of the embodiment as a plastics component, a valve armature of lower weight than in the case of the conventional embodiment as a steel part can be provided. Furthermore, the magnet receptacle and any desired number of equalization grooves can be easily integrated into the valve armature. The lower-weight valve armature and the permanent magnet arranged in the valve armature permit a reduction of the switching energy that has to be imparted in order to adjust the adjustable magnetic valve into a desired axial position between the closed end position and the open end position of its states. In this way, the magnet assembly can be realized with a relatively short coil winding, such that also the winding body and the housing shell of the magnet assembly and the guide sleeve, the static component and the valve armature can be shortened, and the entire installation space of the magnetic valve can be reduced. As a result of the reduced installation length in an axial direction, there is advantageously more structural space available for other assemblies and safety functions in the vehicle.

The valve armature is preferably formed as a plastics injection-molded part, such that the permanent magnet can, in an advantageous embodiment of the adjustable magnetic valve, be injection-molded or installed into the magnet receptacle.

In a further advantageous refinement of the adjustable magnetic valve, the magnetic valve may have an open position in the electrically deenergized state of the magnet assembly. This means that the adjustable magnetic valve is based on a magnetic valve which is closed when electrically deenergized. In this way, the guide sleeve can be formed as a capsule which is open at one end, and the static component can be a valve insert with a passage opening, onto which valve insert the guide sleeve is pushed by way of its open end. An adjustable magnetic valve without a pole core is thus realized, resulting in a weight reduction and, as a result of the elimination of the air gap adjustments, a cost reduction. In this embodiment, the restoring spring can be supported at one end on a spring support of the valve insert and at the other end act on the valve armature, such that the spring force of the restoring spring holds the valve armature with the closing element, in the electrically deenergized state of the magnet assembly, in its maximum open position, in which an air gap between the valve insert and valve armature is at a maximum and the closing element is lifted off from the valve seat. Furthermore, the valve armature may be arranged between the valve insert and the closed end of the guide sleeve and have, at its first face side, a plunger which is guided in the passage bore of the valve insert and at whose side averted from the valve armature the closing element can be arranged. Here, the valve armature and the plunger may be formed as a unipartite plastics injection-molded part or may be formed in multiple parts. In the case of the multiple-part embodiment, the plunger may be connected fixedly to the valve armature. Furthermore, that end of the plunger which is averted from the valve armature may be formed as a closing element or may be connected to a closing element. Furthermore, at a second end of the valve insert, a cap-shaped valve sleeve may be inserted into the passage opening, at the closed end of which valve sleeve the valve seat is formed at the edge of a passage opening.

In a further advantageous embodiment of the adjustable magnetic valve, the magnet assembly may, for the adjustment of the permanent magnet with valve armature, be electrically energized with a first current direction which generates a first magnetic field, which has the effect that the resultant magnetic force acting in a closing direction moves the permanent magnet with the valve armature out of the electrically deenergized open position counter to a force acting in an opening direction, such that the valve armature moves the closing element in a closing direction and reduces an effective flow cross section. Here, an increase of the current intensity and a resulting increased magnetic field strength of the electrically energized magnet assembly can have the effect that the magnetic force acting in the closing direction moves the permanent magnet with the valve armature from a held axial position, in which the magnetic force acting in the closing direction corresponds to the force acting in the opening direction, in the closing direction until a new axial position with balanced forces is reached. A reduction of the current intensity and a resulting reduced magnetic field strength of the electrically energized magnet assembly may have the effect that the acting force in the opening direction moves the permanent magnet with the valve armature from a held axial position, in which the magnetic force acting in the closing direction corresponds to the force acting in the opening direction, in the opening direction until a new axial position with balanced forces is reached. The force acting in the opening direction may correspond to a sum of the acting spring force of the restoring spring and of the fluid force acting in the magnetic valve. An easy adjustment of a desired volume flow through the adjustable magnetic valve is advantageously possible through variation of the current intensity through the coil winding proceeding from the electrically deenergized open position.

In an alternative embodiment, the magnetic valve may have a closed position in the electrically deenergized state of the magnet assembly. This means that the adjustable magnetic valve is based on a magnetic valve which is open when electrically deenergized. Thus, the guide sleeve may be designed to be open at both ends, and the static component may be a pole core which can close off the guide sleeve at a first end. In this embodiment, the restoring spring between the pole core and the valve armature may for example be arranged in a spring receptacle designed as a blind bore, such that, in the electrically deenergized state of the magnet assembly, the spring force of the restoring spring, via the valve armature, can force the closing element into the valve seat, and an air gap between pole core and valve armature can be at a maximum. Furthermore, the guide sleeve may be connected at a second end to a cap-shaped valve sleeve, at the base of which the valve seat is formed at the edge of a passage opening.

In a further advantageous refinement of the adjustable magnetic valve, the magnet assembly may, for the adjustment of the permanent magnet with valve armature, be electrically energized with a second current direction which generates a second magnetic field, which can have the effect that a magnetic force acting in an opening direction moves the permanent magnet with the valve armature out of the electrically deenergized closed position counter to a force acting in a closing direction, such that the valve armature moves the closing element in an opening direction and increases the effective flow cross section. Here, an increase of the current intensity and a resulting increased magnetic field strength of the electrically energized magnet assembly can have the effect that the magnetic force acting in the opening direction moves the permanent magnet with the valve armature from a held axial position, in which the magnetic force acting in the opening direction corresponds to the force acting in the closing direction, in the opening direction until a new axial position with balanced forces is reached. A reduction of the current intensity and a resulting reduced magnetic field strength of the electrically energized magnet assembly can have the effect that the acting force in the closing direction moves the permanent magnet with the valve armature from a held axial position, in which the magnetic force acting in the opening direction corresponds to the force acting in the closing direction, in the closing direction until a new axial position with balanced forces is reached. The force acting in the closing direction may correspond to a sum of the acting spring force of the restoring spring and of the fluid force acting in the magnetic valve. An easy adjustment of a desired volume flow through the adjustable magnetic valve is advantageously possible through variation of the current intensity through the coil winding proceeding from the electrically deenergized closed position.

BRIEF DESCRIPTION OF THE DRAWINGS

Exemplary embodiments of the disclosure are illustrated in the drawings and will be discussed in more detail in the following description. In the drawings, the same reference designations are used to denote components or elements which perform the same or similar functions.

DETAILED DESCRIPTION

Figure 1:
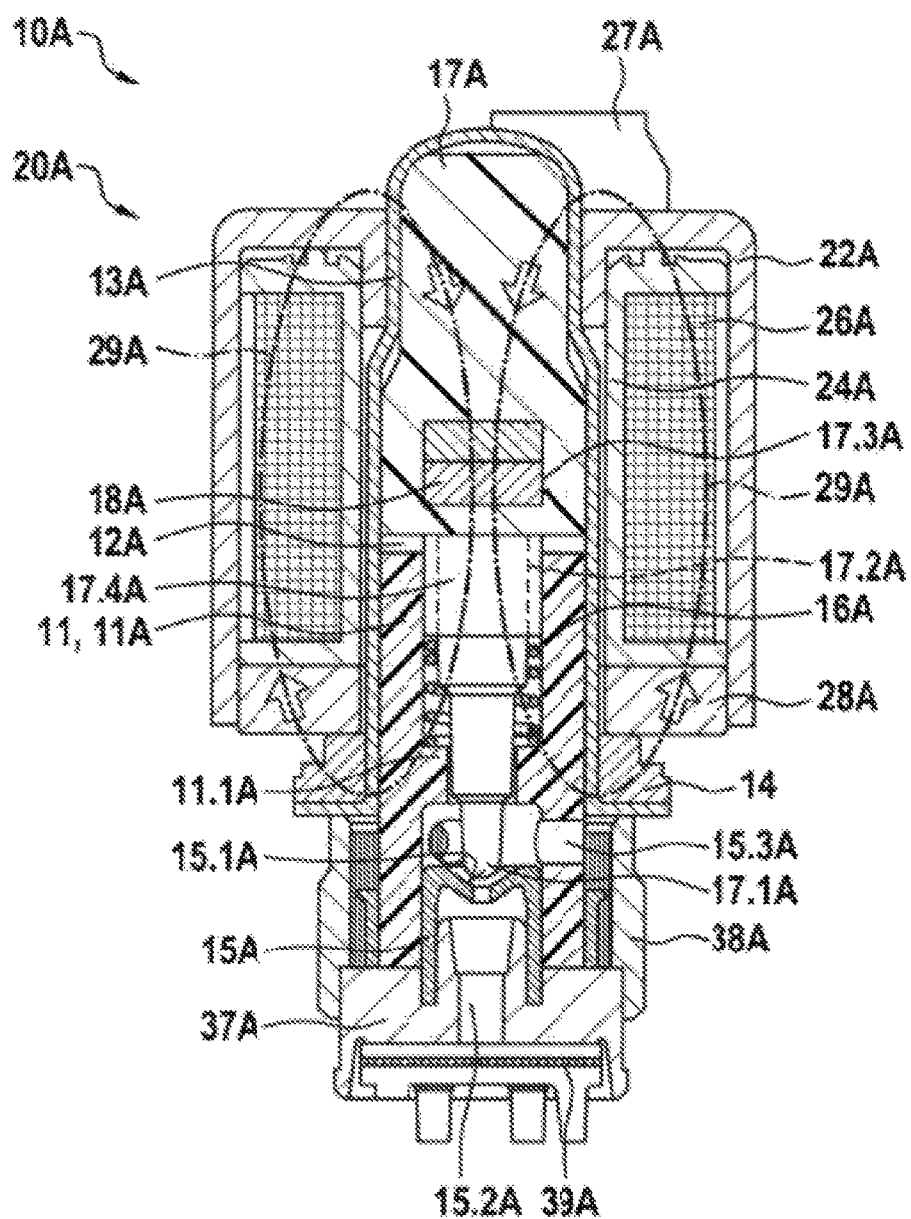
FIG. 1 shows a schematic perspective sectional illustration of a first exemplary embodiment of an adjustable magnetic valve according to the disclosure in an open position.

As can be seen from FIGS. 1 to 5, the illustrated exemplary embodiments of an adjustable magnetic valve 10A, 10B, 10C, 10D, 10E according to the disclosure comprise in each case a magnet assembly 20A, 20B, 20C, 20D, 20E and a guide sleeve 13A, 13B, 13C, 13D, 13E, in which a static component 11 is arranged fixedly and a valve armature 17A, 17B, 17C, 17D, 17E is arranged so as to be axially displaceable counter to the force of a restoring spring 16A, 16B, 16C, 16D, 16E. The magnet assembly 20A, 20B, 20C, 20D, 20E is pushed onto the static component 11 and the guide sleeve 13A, 13B, 13C, 13D, 13E, wherein the static component 11 forms an axial stop for the valve armature 17A, 17B, 17C, 17D, 17E. The valve armature 17A, 17B, 17C, 17D, 17E can be driven by a magnetic force generated by the electrically energized magnet assembly 20A, 20B, 20C, 20D, 20E and, during a movement in a closing direction, forces a closing element 17.1A, 17.1B, 17.1C, 17.1D, 17.1E into a valve seat 15.1A, 15.1B, 15.1C, 15.1D, 15.1E and, during a movement in an opening direction, lifts the closing element 17.1A, 17.1B, 17.1C, 17.1D, 17.1E out of the valve seat 15.1A, 15.1B, 15.1C, 15.1D, 15.1E. Here, the valve armature 17A, 17B, 17C, 17D, 17E and the static component 11 are each formed as plastics components. Furthermore, the valve armature 17A, 17B, 17C, 17D, 17E has, at its first face side facing toward the static component 11, a magnet receptacle 17.3A, 17.3B, 17.3C, 17.3D, 17.3E which receives a permanent magnet 18A, 18B, 18C, 18D, 18E, which is polarized in terms of its movement direction, such that the permanent magnet 18A, 18B, 18C, 18D, 18E is arranged within the magnet assembly 20A, 20B, 20C, 20D, 20E regardless of the armature stroke.

In the exemplary embodiment illustrated, a held axial position of the permanent magnet 18A, 18B, 18C, 18D, 18E and of the movable valve armature 17A, 17B, 17C, 17D, 17E can be predefined in a manner dependent on the current intensity of the electrically energized magnet assembly 20A, 20B, 20C, 20D, 20E. Furthermore, in the illustrated exemplary embodiments, the permanent magnet 18A, 18B, 18C, 18D, 18E is injection-molded into the magnet receptacle 17.3A, 17.3B, 17.3C, 17.3D, 17.3E. This means that, during the production of the valve armature 17A, 17B, 17C, 17D, 17E as a plastics injection-molded part, the permanent magnet 18A, 18B, 18C, 18D, 18E is placed as an insert part into the tool and is encapsulated by injection molding. In exemplary embodiments that are not illustrated, the permanent magnet 18A, 18B, 18C, 18D, 18E may for example be installed into a magnet receptacle 17.3A, 17.3B, 17.3C, 17.3D, 17.3E formed as a cutout in the valve armature 17A, 17B, 17C, 17D, 17E, and held for example by means of a clip connection or adhesive connection. In the exemplary embodiments illustrated, the permanent magnet 18A, 18B, 18C, 18D, 18E is designed in each case as a disk or plate which, in the exemplary embodiments illustrated in FIGS. 4 and 5, has a hole which is extended through by the restoring spring 16D, 16E.

Figure 2:
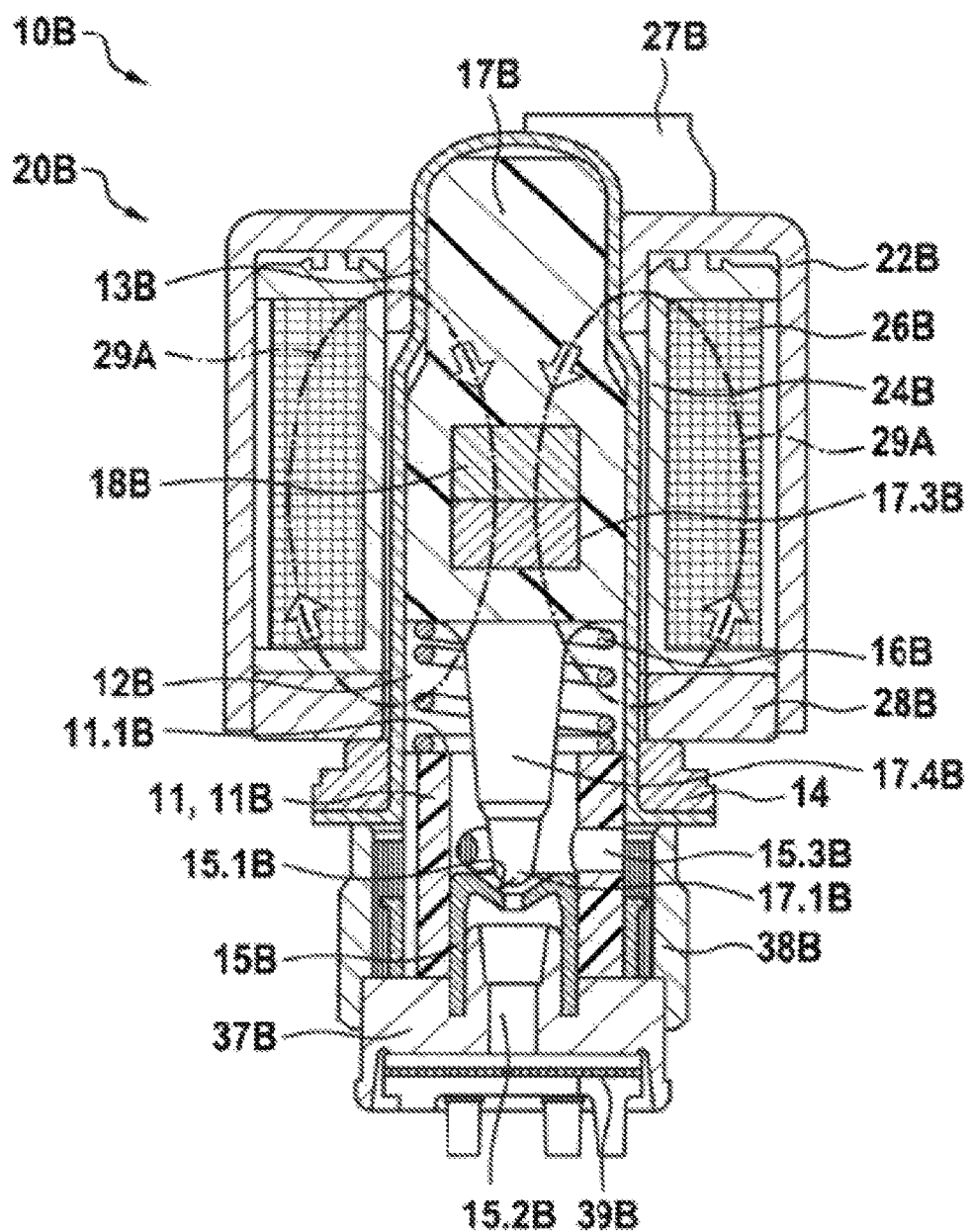
FIG. 2 shows a schematic perspective sectional illustration of a second exemplary embodiment of an adjustable magnetic valve according to the disclosure in an open position.
Figure 3:
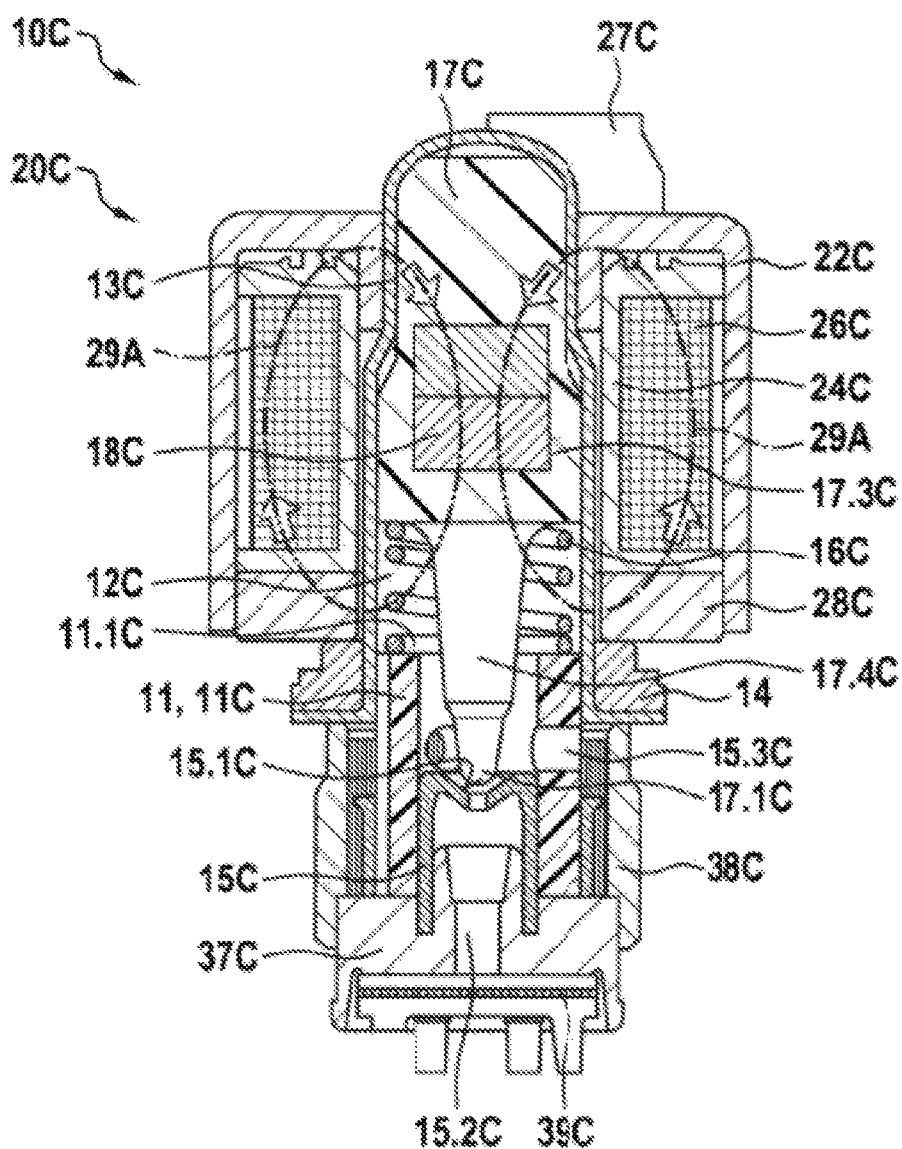
FIG. 3 shows a schematic perspective sectional illustration of a third exemplary embodiment of an adjustable magnetic valve according to the disclosure in an open position.

As can also be seen from FIGS. 1 to 3, the illustrated exemplary embodiments of the adjustable magnetic valve 10A, 10B, 10C are based on a magnetic valve which is open when electrically deenergized, such that the illustrated adjustable magnetic valves 10A, 10B, 10C each have an illustrated open position in the electrically deenergized state of the corresponding magnet assembly 20A, 20B, 20C.

As can also be seen from FIGS. 1 to 3, in the exemplary embodiments illustrated, the magnet assemblies 20A, 20B, 20C each have a cap-shaped housing shell 22A, 22B, 22C, a winding body 24A, 24B, 24C, to which a coil winding 26A, 26B, 26C is applied, and a cover disk 28A, 28B, 28C, which closes off the cap-shaped housing shell 22A, 22B, 22C at its open side. The coil winding 26A, 26B, 26C can be electrically energized via two electrical contacts 27, of which only one is visible and which are led out of the housing shell 22A, 22B, 22C.

As can also be seen from FIGS. 1 to 3, in the exemplary embodiments illustrated, the guide sleeves 13A, 13B, 13C are formed as capsules which are open at one end. The static components 11 are each formed as a valve insert 11A, 11B, 11C with a passage opening, onto which valve insert the respective guide sleeve 13A, 13B, 13C is pushed by way of its open end. As can also be seen from FIGS. 1 to 3, in the illustrated exemplary embodiments, the restoring springs 16A, 16B, 16C are each supported at one end on a spring support 11.1A, 11.1B, 11.1C of the valve insert 11A, 11B, 11C and act at the other end on the valve armature 17A, 17B, 17C, such that the spring force of the respective restoring spring 16A, 16B, 16C holds the corresponding valve armature 17A, 17B, 17C with the closing element 17.1A, 17.1B, 17.1C, in the electrically deenergized state of the magnet assembly 20A, 20B, 20C, in its maximum open position, in which an air gap 12A, 12B, 12C between the valve insert 11A, 11B, 11C and valve armature 17A, 17B, 17C is at a maximum and the closing element 17.1A, 17.1B, 17.1C is lifted off from the valve seat 15.1A, 15.1B, 15.1C. The valve armature 17A, 17B, 17C is in each case arranged between the valve insert 11A, 11B, 11C and the closed end of the guide sleeve 13A, 13B, 13C and has, at its first face side, a plunger 17.4A, 17.4B, 17.4C which is guided in the passage bore of the valve insert 11A, 11B, 11C and at whose side averted from the valve armature 17A, 17B, 17C the closing element 17.1A, 17.1B, 17.1C is arranged. In the illustrated exemplary embodiments, the closing element 17.1A, 17.1B, 17.1C is formed in each case as a spherical cap integrally formed on the plunger. At a second end of the valve insert 11A, 11B, 11C, a cap-shaped valve sleeve 15A, 15B, 15C is inserted into the passage opening, at the closed end of which valve sleeve the valve seat 15.1A, 15.1B, 15.1C is formed at the edge of a passage opening. The valve seat 15.1A, 15.1B, 15.1C is arranged between at least one first flow opening 15.2A, 15.2B, 15.2C and at least one second flow opening 15.3A, 15.3B, 15.3C. The magnetic valves 10A, 10B, 10C may each be calked by means of a calking disk 14 with a receiving bore (not illustrated in FIGS. 1 to 3) of a fluid block which has multiple fluid ducts. As can also be seen from FIGS. 1 to 3, a first flow opening 15.2A, 15.2B, 15.2C is arranged on a valve lower part 37A, 37B, 34C with a flat filter 39A, 39B, 39C and is continued through the cap-shaped valve sleeve 15A, 15B, 15C and the passage bore, on the inner edge of which the valve seat 15.1A, 15.1B, 15.1C is formed. The at least one second flow opening 15.3A, 15.3B, 15.3C is formed as a radial bore into the lateral shell surface of the valve seat 11A, 11B, 11C. A radial filter 38A, 38B, 38C is arranged in the region of the second flow openings 15.3A, 15.3B, 15.3C.

As can also be seen from FIG. 1, the valve armature 17A and the plunger 17.4A in the illustrated first exemplary embodiment of the adjustable magnetic valve 10A are formed as separate plastics components which are fixedly connected to one another. Here, the plunger 17.4C comprises multiple equalization grooves 17.2C designed as axial grooves, which permit a pressure equalization between the closing element 17.1A, facing toward the valve seat 15.1A, of the plunger 17.4C and an air gap 12A between valve armature 17A and valve insert 11A. As can also be seen from FIG. 1, in the illustrated first exemplary embodiment of an adjustable magnetic valve 10A, the restoring spring 16A is arranged in the passage bore of the valve insert 11A. In the illustrated exemplary embodiment, the spring support 11.1A is formed in one piece with the valve insert 11A formed as a plastics component. Alternatively, the spring support may be formed as a ring which is inserted into the passage bore of the valve insert 11A.

As can also be seen from FIGS. 2 and 3, in the illustrated second and third exemplary embodiments of the adjustable magnetic valve 10B, 10C, the valve armatures 17B, 17C and the plungers 17.4B, 17.4C are each formed as a unipartite plastics component. Since the valve inserts 11B, 11C are designed to be shorter than in the first exemplary embodiment from FIG. 1, a face side, facing toward the valve armature 17B, 17C, forms the spring support 11.1B, 11.1C for the restoring spring 16B, 16C, which in the exemplary embodiments illustrated in FIGS. 2 and 3 is arranged in each case in the air gap 12B, 12C between the valve insert 11B, 11C and the valve armature 17B, 17C.

As can be seen from the comparison between the first exemplary embodiment of the adjustable magnetic valve 10A illustrated in FIG. 1 and the exemplary embodiments of the adjustable magnetic valve 10B, 10C illustrated in FIGS. 2 and 3, the second exemplary embodiment of an adjustable magnetic valve 10B illustrated in FIG. 2 has, with the same functionality, a smaller height than the first exemplary embodiment of an adjustable magnetic valve 10A illustrated in FIG. 1, and the third exemplary embodiment of an adjustable magnetic valve 10C illustrated in FIG. 3 has, with the same functionality, a smaller height than the second exemplary embodiment of an adjustable magnetic valve 10B illustrated in FIG. 2. As can also be seen from FIGS. 1 to 3, the magnet assembly 20C with the cap-shaped housing shell 22C, the winding body 24C, the coil winding 26C and the cover disk 28C in the illustrated third exemplary embodiment of the magnetic valve 10C from FIG. 3 is shorter than the magnet assembly 20B of the second exemplary embodiment of the adjustable magnetic valve 10B from FIG. 2, which in turn is designed to be shorter than the magnet assembly 20A of the first exemplary embodiment of an adjustable magnetic valve 10A from FIG. 1. Also, the guide sleeve 13C, the valve insert 11C and the valve armature 17C of the third exemplary embodiment of the magnetic valve 10C illustrated in FIG. 3 are shorter than the guide sleeve 13B, the valve insert 11B and the valve armature 17B of the second exemplary embodiment of the magnetic valve 10B illustrated in FIG. 2, which in turn are designed to be shorter than the guide sleeve 13A, the valve insert 11A and the valve armature 17A of the first exemplary embodiment of the magnetic valve 10A illustrated in FIG. 1. The embodiments of the cap-shaped valve sleeves 15A, 15B, 15C with the valve seat 15.1A, 15.1B, 15.1C, with the at least one first flow opening 15.2A, 15.2B, 15.2C and with the at least one second flow opening 15.3A, 15.3B, 15.3C, and the valve lower parts 37A, 37B, 37C with the flat filter 39A, 39B, 39C and the radial filter 38A, 38B, 38C, are of identical design in the exemplary embodiments illustrated in FIGS. 1 to 3.

In the exemplary embodiments of an adjustable magnetic valve 10A, 10B, 10C illustrated in FIGS. 1 to 3, the magnet assembly 20A, 20B, 20C is, for the adjustment of the permanent magnet 18A, 18B, 18C with valve armature 17A, 17B, 17C, electrically energized with a first current direction which generates a first magnetic field 29A, which has the effect that the resultant magnetic force acting in a closing direction moves the permanent magnet 18A, 18B, 18C with the valve armature 17A, 17B, 17C out of the electrically deenergized open position counter to a force acting in an opening direction, such that the valve armature 17A, 17B, 17C moves the closing element 17.1A, 17.1B, 17.1C in a closing direction and reduces an effective flow cross section. The force acting in the opening direction corresponds to a sum of the acting spring force of the restoring spring 16A, 16B, 16C and of the fluid force acting in the magnetic valve 10A, 10B, 10C. Thus, an increase of the current intensity and a resulting increased magnetic field strength of the electrically energized magnet assembly 20A, 20B, 20C have the effect that the magnetic force acting in the closing direction moves the permanent magnet 18A, 18B, 18C with the valve armature 17A, 17B, 17C from a held axial position, in which the magnetic force acting in the closing direction corresponds to the force acting in the opening direction, in the closing direction until a new axial position with balanced forces is reached. A reduction of the current intensity and a resulting reduced magnetic field strength of the electrically energized magnet assembly 20A, 20B, 20C have the effect that the acting force in the opening direction moves the permanent magnet 18A, 18B, 18C with the valve armature 17A, 17B, 17C from a held axial position, in which the magnetic force acting in the closing direction corresponds to the force acting in the opening direction, in the opening direction until a new axial position with balanced forces is reached or the valve armature 17A, 17B, 17C reaches the end position.

Figure 4:
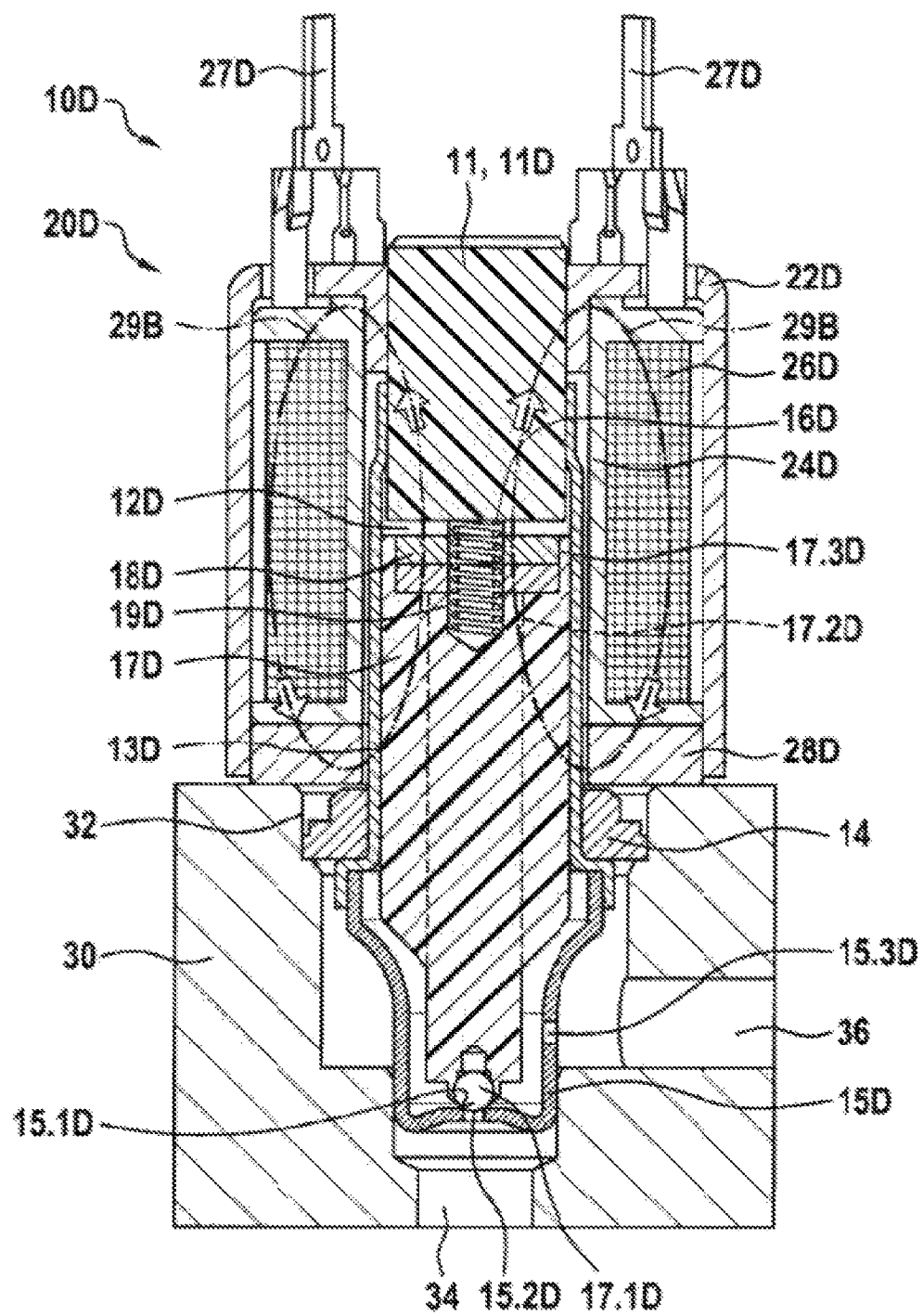
FIG. 4 shows a schematic perspective sectional illustration of a fourth exemplary embodiment of an adjustable magnetic valve according to the disclosure in a closed position.
Figure 5:
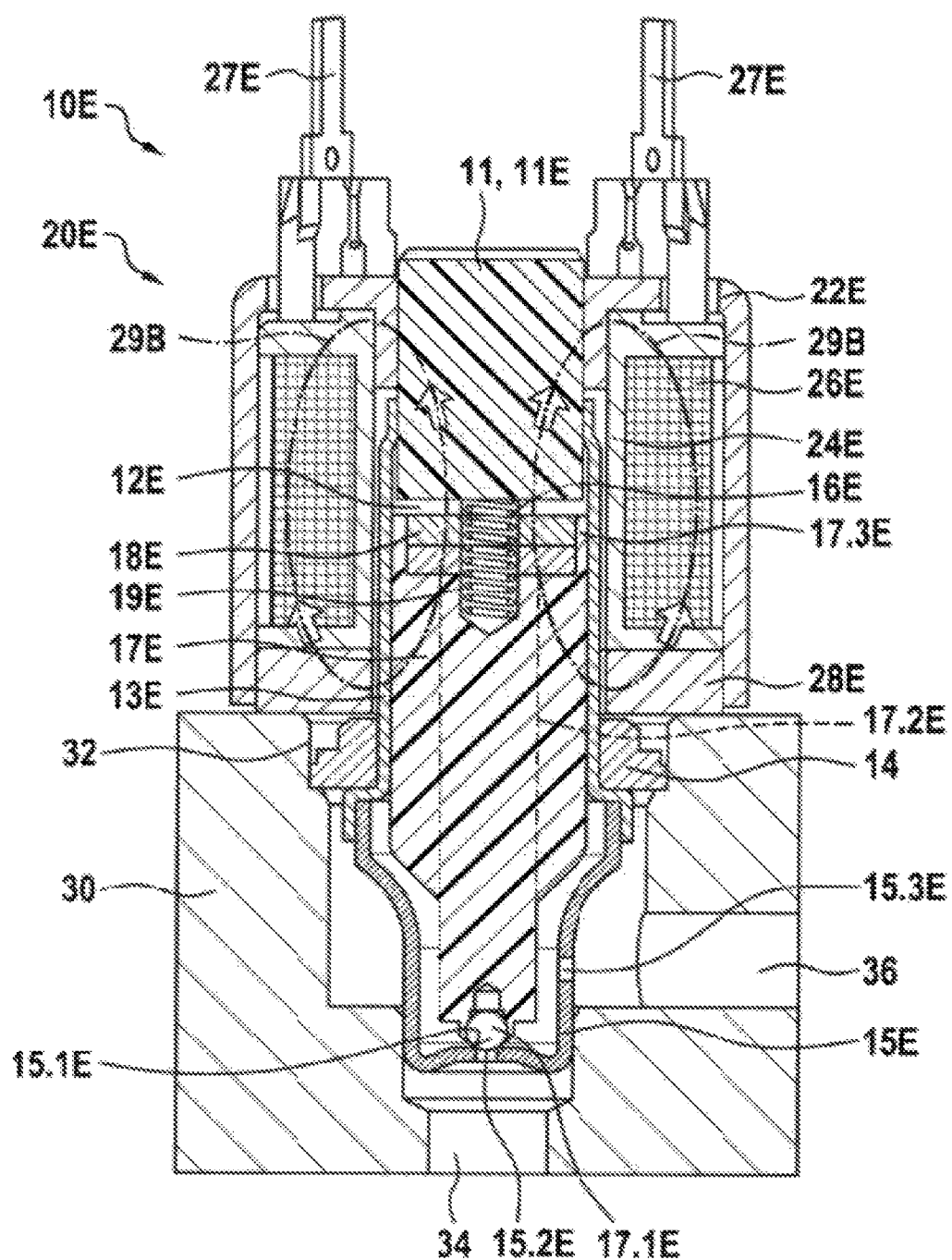
FIG. 5 shows a schematic perspective sectional illustration of a fifth exemplary embodiment of an adjustable magnetic valve according to the disclosure in a closed position.

As can also be seen from FIGS. 4 and 5, the illustrated exemplary embodiments of the adjustable magnetic valve 10D, 10E are based on a magnetic valve which is closed when electrically deenergized, such that the illustrated adjustable magnetic valves 10D, 10E each have an illustrated closed position in the electrically deenergized state of the corresponding magnet assembly 20D, 20E.

As can also be seen from FIGS. 4 and 5, the 20D, 20E in the illustrated exemplary embodiments each comprise, analogously to the exemplary embodiments illustrated in FIGS. 1 to 3, a cap-shaped housing shell 22D, 22E, a winding body 24D, 24E, to which a coil winding 26D, 26E is applied, and a cover disk 28D, 28E, which closes off the cap-shaped housing shell 22D, 22E at its open side. The coil winding 26D, 26E can be electrically energized via two electrical contacts 27, which are led out of the housing shell 22D, 22E.

As can also be seen from FIGS. 4 and 5, in the exemplary embodiments illustrated, the guide sleeves 13D, 13E are designed to be open at both ends. Furthermore, the static components 11 are each designed as a pole core 11D, 11E which is formed as a plastics component and which closes off the guide sleeve 17D, 17E at a first end. In the exemplary embodiments illustrated, the restoring spring 16D, 16E is arranged between the pole core 11D, 11E and the valve armature 17D, 17E, such that, in the electrically deenergized state of the magnet assembly 20D, 20E, the spring force of the restoring spring 16D, 16E, via the valve armature 17D, 17E, forces the closing element 17.1D, 17.1E into the valve seat 15.1D, 15.1E, and the air gap 12D, 12E between pole core 11D, 11E and valve armature 17D, 17E is at a maximum. As can also be seen from FIGS. 4 and 5, a spring receptacle 19D, 19E formed as a blind bore in the valve armature 17D, 17A at least partially receives the restoring spring 16D, 16E. Furthermore, the guide sleeve 17D, 17E is connected at a second end to a cap-shaped valve sleeve 15D, 15E, at the base of which the valve seat 15.1D, 15E is formed at the edge of a passage opening. Here, the valve seat 15.1D, 15E is arranged between at least one first flow opening 15.2D, 15.2E and at least one second flow opening 15.3D, 15.3E.

As can also be seen from FIGS. 4 and 5, in the illustrated exemplary embodiments, the magnetic valve 10D, 10E is in each case calked by means of a calking disk 14 with a receiving bore 32 of a fluid block 30 which has multiple fluid ducts 34, 36. As can also be seen from FIGS. 4 and 5, a first flow opening 15.2D, 15.2E, on the inner edge of which the valve seat 15.1D, 15.1E is formed, is formed into a base of the cap-shaped valve sleeve 15D, 15E and is fluidically connected to a first fluid duct 34. The at least one second flow opening 15.3D, 15.3E is formed as a radial bore into the lateral shell surface of the cap-shaped valve sleeve 15D, 15E and is fluidically connected to a second fluid duct 36.

As can also be seen from FIGS. 4 and 5, in the illustrated exemplary embodiments, the closing element 17.1D, 17.1E is formed as a ball and is pressed into a receptacle in the valve armature 17D, 17E which is arranged on a second face side, facing toward the valve seat 15.1D, 15.1E, of the valve armature 17D, 17E. Furthermore, the valve armature 17D, 17E comprises multiple equalization grooves 17.2D, 17.2E, which are formed as axial grooves and which permit a pressure equalization between the first and second face sides of the valve armature 17D, 17E.

As can be seen from the comparison between the fourth exemplary embodiment of the adjustable magnetic valve 10D illustrated in FIG. 4 and the fifth exemplary embodiment of the adjustable magnetic valve 10E illustrated in FIG. 5, the fifth exemplary embodiment of an adjustable magnetic valve 10D illustrated in FIG. 5 has, with the same functionality, a smaller height than the fourth exemplary embodiment of an adjustable magnetic valve 10D illustrated in FIG. 4. As can also be seen from FIGS. 4 and 5, the magnet assembly 20E with the cap-shaped housing shell 22E, the winding body 24E, the coil winding 26E and the cover disk 28E in the illustrated fifth exemplary embodiment of the magnetic valve 10E from FIG. 5 is designed to be shorter than the magnet assembly 20D of the fourth exemplary embodiment of the adjustable magnetic valve 10D from FIG. 4. Also, the guide sleeve 13E, the pole core 11E and the valve armature 17E of the fifth exemplary embodiment of the magnetic valve 10E illustrated in FIG. 5 are designed to be shorter than the guide sleeve 13D, the pole core 11D and the valve armature 17D of the fourth exemplary embodiment of the magnetic valve 10D illustrated in FIG. 4. The embodiments of the cap-shaped valve sleeves 15D, 15E with the valve seat 15.1D, 15.1E, with the at least one first flow opening 15.2D, 15.2E and with the at least one second flow opening 15.3D, 15.3E are of identical design in the exemplary embodiments illustrated in FIGS. 4 and 5.

In the exemplary embodiments of an adjustable magnetic valve 10D, 10E illustrated in FIGS. 4 and 5, the magnet assembly 20D, 20E is, for the adjustment of the permanent magnet 18D, 20E with valve armature 17D, 17E, electrically energized with a second current direction which generates a second magnetic field 29B, which has the effect that a magnetic force acting in an opening direction moves the permanent magnet 18D, 18E with the valve armature 17D, 17E out of the electrically deenergized closed position counter to a force acting in a closing direction, such that the valve armature 17D, 17E moves the closing element 17.1D, 17.1E in an opening direction and increases the effective flow cross section. In these exemplary embodiments, the force acting in the closing direction corresponds to a sum of the acting spring force of the restoring spring 16D, 16E and of the fluid force acting in the magnetic valve 10D, 10E. An increase of the current intensity and a resulting increased magnetic field strength of the electrically energized magnet assembly 20D, 20E have the effect that the magnetic force acting in the opening direction moves the permanent magnet 18D, 18E with the valve armature 17D, 17E from a held axial position, in which the magnetic force acting in the opening direction corresponds to the force acting in the closing direction, in the opening direction until a new axial position with balanced forces is reached. A reduction of the current intensity and a resulting reduced magnetic field strength of the electrically energized magnet assembly 20D, 20E have the effect that the acting force in the closing direction moves the permanent magnet 18D, 18E with the valve armature 17D, 17E from a held axial position, in which the magnetic force acting in the opening direction corresponds to the force acting in the closing direction, in the closing direction until a new axial position with balanced forces is reached or the closing element 17.1D, 17.1E reaches the closed end position and lies sealingly in the valve seat 15.1D, 15.1E.

What is claimed is:

1. An adjustable magnetic valve, comprising:
   a magnet assembly; and
   a guide sleeve in which a static component is arranged fixedly and a valve armature is arranged so as to be axially displaceable counter to a spring force of a restoring spring,
   wherein the magnet assembly is arranged on the guide sleeve, the static component forming an axial stop for the valve armature,
   wherein the valve armature is configured to be driven by a magnetic force generated by the electrically energized magnet assembly and, during a movement in a closing direction, forces a closing element into a valve seat and, during a movement in an opening direction, lifts the closing element out of the valve seat, and
   wherein the valve armature and the static component are each formed as plastics components,
   wherein the valve armature has a magnet receptacle that receives a permanent magnet, which is polarized in terms of its movement direction, such that the permanent magnet is arranged within the magnet assembly regardless of the armature stroke.

2. The adjustable magnetic valve according to claim 1, wherein an axial position of the permanent magnet and of the movable valve armature is predefinable in a manner dependent on a current intensity of the electrically energized magnet assembly.

3. The adjustable magnetic valve according to claim 1, wherein the permanent magnet is injection-molded or installed into the magnet receptacle.

4. The adjustable magnetic valve according to claim 1, wherein the magnetic valve has an open position in the electrically deenergized state of the magnet assembly.

5. The adjustable magnetic valve according to claim 4, wherein the guide sleeve is formed as a capsule that is open at one end, and the static component is a valve insert with a passage opening, the guide sleeve pushed onto the valve insert by way of the open end of the guide sleeve.

6. The adjustable magnetic valve according to claim 5, wherein the restoring spring is supported at one end on a spring support of the valve insert and at the other end on the valve armature, such that the spring force of the restoring spring holds the valve armature with the closing element, in the electrically deenergized state of the magnet assembly, in a maximum open position, in which an air gap between the valve insert and the valve armature is at a maximum and the closing element is lifted off from the valve seat.

7. The adjustable magnetic valve according to claim 6, wherein, for adjustment of the permanent magnet with the valve armature, the magnet assembly is electrically energized with a first current direction that generates a first magnetic field, which has the effect that the resultant magnetic force acting in a closing direction moves the permanent magnet with the valve armature out of the electrically deenergized open position counter to a force acting in an opening direction, such that the valve armature moves the closing element in a closing direction and reduces an effective flow cross section.

8. The adjustable magnetic valve according to claim 7, wherein an increase of the current intensity and a resulting increased magnetic field strength of the electrically energized magnet assembly has the effect that the magnetic force acting in the closing direction moves the permanent magnet with the valve armature from a held axial position, in which the magnetic force acting in the closing direction corresponds to the force acting in the opening direction, in the closing direction until a new axial position with balanced forces is reached.

9. The adjustable magnetic valve according to claim 8, wherein the force acting in the opening direction corresponds to a sum of the acting spring force of the restoring spring and of the fluid force acting in the magnetic valve.

10. The adjustable magnetic valve according to claim 9, wherein the guide sleeve is configured to be open at both ends, and the static component is a pole core that closes off the guide sleeve at a first end.

11. The adjustable magnetic valve according to claim 10, wherein the restoring spring is arranged between the pole core and the valve armature such that, in the electrically deenergized state of the magnet assembly, the spring force of the restoring spring, via the valve armature, forces the closing element into the valve seat, and an air gap between pole core and the valve armature is at a maximum.

12. The adjustable magnetic valve according to claim 10, wherein the guide sleeve is connected at a second end to a cap-shaped valve sleeve, at the base of which the valve seat is formed at the edge of a passage opening.

13. The adjustable magnetic valve according to claim 12, wherein a reduction of the current intensity and a resulting reduced magnetic field strength of the electrically energized magnet assembly has the effect that the acting force in the closing direction moves the permanent magnet with the valve armature from a held axial position, in which the magnetic force acting in the opening direction corresponds to the force acting in the closing direction, in the closing direction until a new axial position with balanced forces is reached.

14. The adjustable magnetic valve according to claim 10, wherein, for the adjustment of the permanent magnet with valve armature, the magnet assembly is electrically energized with a second current direction which generates a second magnetic field, which has the effect that a magnetic force acting in an opening direction moves the permanent magnet with the valve armature out of the electrically deenergized closed position counter to a force acting in a closing direction, such that the valve armature moves the closing element in an opening direction and increases the effective flow cross section.

15. The adjustable magnetic valve according to claim 14, wherein an increase of the current intensity and a resulting increased magnetic field strength of the electrically energized magnet assembly has the effect that the magnetic force acting in the opening direction moves the permanent magnet with the valve armature from a held axial position, in which the magnetic force acting in the opening direction corresponds to the force acting in the closing direction, in the opening direction until a new axial position with balanced forces is reached.

16. The adjustable magnetic valve according to claim 15, wherein the force acting in the closing direction corresponds to a sum of the acting spring force of the restoring spring and of the fluid force acting in the magnetic valve.

17. The adjustable magnetic valve according to claim 7, wherein a reduction of the current intensity and a resulting reduced magnetic field strength of the electrically energized magnet assembly has the effect that the acting force in the opening direction moves the permanent magnet with the valve armature from a held axial position, in which the magnetic force acting in the closing direction corresponds to the force acting in the opening direction, in the opening direction until a new axial position with balanced forces is reached.

18. The adjustable magnetic valve according to claim 5, wherein the valve armature is arranged between the valve insert and the closed end of the guide sleeve and has, at a first face side, a plunger which is guided in the passage bore of the valve insert and at whose side averted from the valve armature the closing element is arranged.

19. The adjustable magnetic valve according to claim 18, wherein, at a second end of the valve insert, a cap-shaped valve sleeve is inserted into the passage opening, at the closed end of which valve sleeve the valve seat is formed at the edge of a passage opening.

20. The adjustable magnetic valve according to claim 1, wherein the magnetic valve has a closed position in the electrically deenergized state of the magnet assembly.

* * * * *